United States Patent [19]

Azaren et al.

[11] Patent Number: 5,357,249
[45] Date of Patent: Oct. 18, 1994

[54] APPARATUS AND METHOD FOR HIGH SPEED FLEXIBLE MULTIPLEXING FOR FIBER OPTIC DATA TRANSMISSIONS

[75] Inventors: Daniel J. Azaren, Encino; Christian R. Wiher, Hermosa Beach, both of Calif.

[73] Assignee: TRW Inc., Redondo Beach, Calif.

[21] Appl. No.: 779,756

[22] Filed: Oct. 21, 1991

[51] Int. Cl.$^5$ ............................................. H03M 9/00
[52] U.S. Cl. .................................... 341/100; 341/101; 375/120; 331/25
[58] Field of Search ............... 341/100, 101; 371/47.1, 371/49.1, 49.2; 375/110, 120; 331/25

[56] References Cited

U.S. PATENT DOCUMENTS

| | | | |
|---|---|---|---|
| 3,742,199 | 6/1973 | Lubarsky | 341/100 X |
| 4,608,702 | 8/1986 | Hirzel et al. | 375/110 |
| 4,675,652 | 6/1987 | Machado | 341/100 X |
| 4,710,922 | 12/1987 | Scott | 341/100 X |
| 4,728,930 | 3/1988 | Grote et al. | 341/101 |
| 4,751,699 | 6/1988 | Tarridec et al. | 370/84 |
| 5,030,951 | 7/1991 | Eda et al. | 341/100 |

Primary Examiner—Howard L. Williams

[57] ABSTRACT

Disclosed is a method and apparatus for flexibly converting an electrical parallel digital data signal to a serial optical digital data signal for transmission along a fiber optic cable and then subsequent conversion back to a parallel electrical digital data signal. An input conditioner circuit is used to set a ratio between a transmission link clock rate and a sample clock rate such that the ratio determines the number of bits being transmitted for a sample word thus enhancing the flexibility of the device to different sampling rates. Each individual sample word is a frame of data which includes a single frame bit set up in a 4-bit frame pattern. A first frame bit is a sync acquisition bit comprised of an alternating sequence of "0"s and "1"s, a second and fourth parity bit computed from the parity of the previous two words of data, and a third channel identification bit. An output conditioner circuit receives the serial stream of data bits to convert it back to a parallel data format. The output conditioner further must identify and remove the frame bits as discussed above for proper processing. By this, the system can transmit data at flexible sample rates.

37 Claims, 10 Drawing Sheets

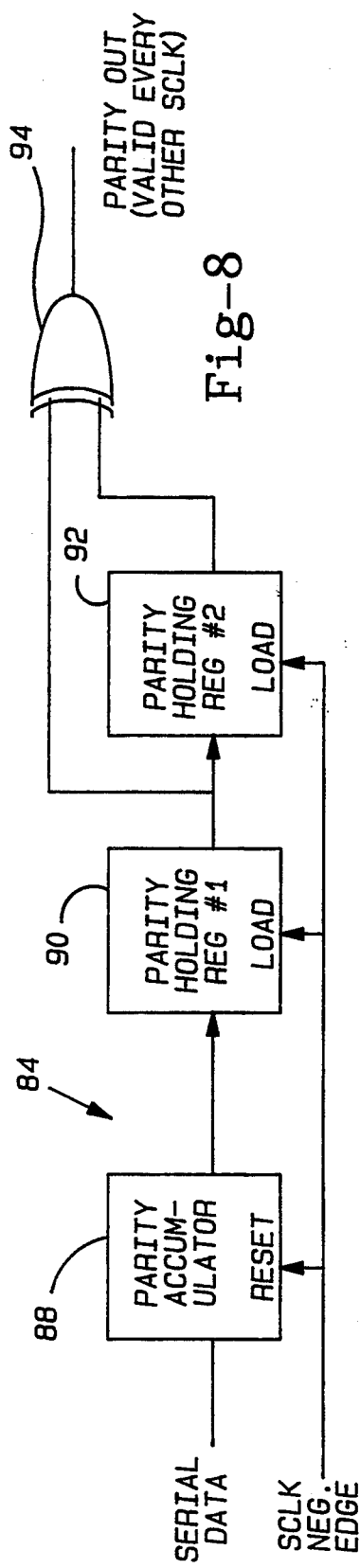
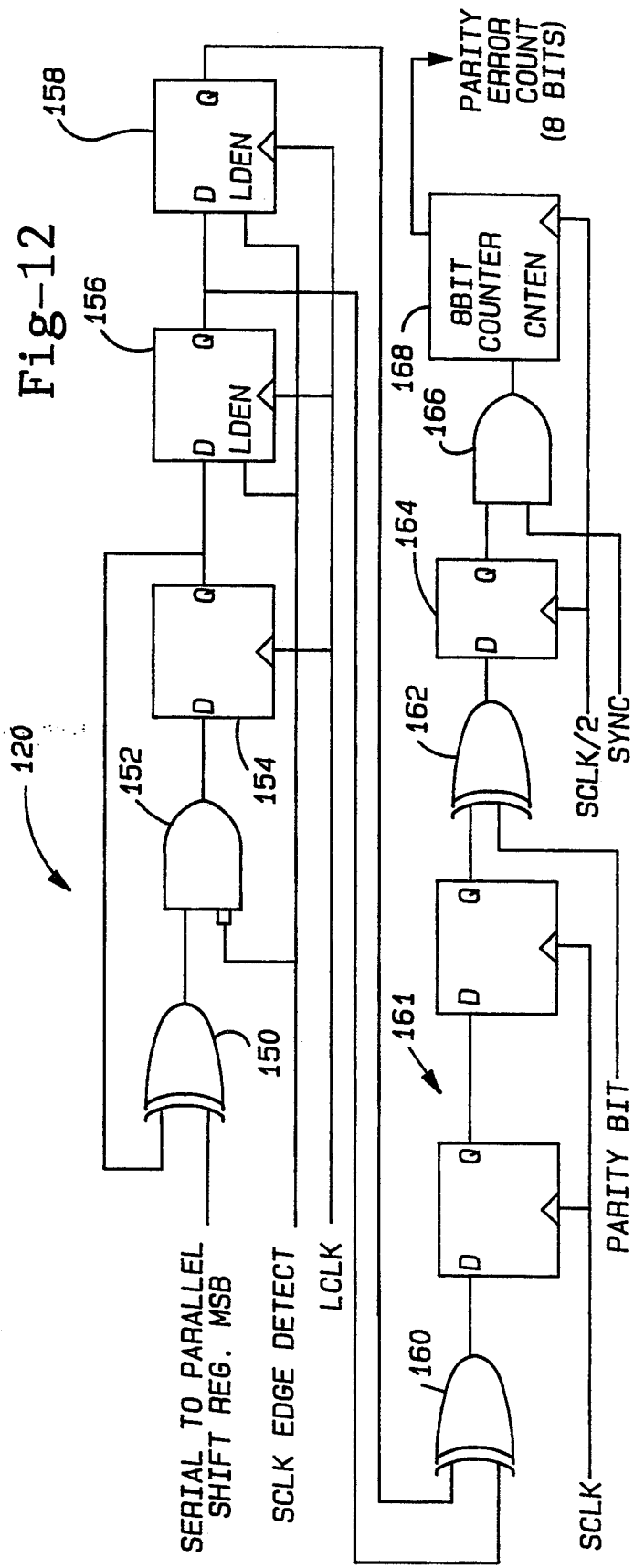

2

APPARATUS AND METHOD FOR HIGH SPEED FLEXIBLE MULTIPLEXING FOR FIBER OPTIC DATA TRANSMISSIONS

The U.S. Government has certain rights in this invention in limited circumstances.

BACKGROUND OF THE INVENTION

1. Field of the Invention

This invention relates generally to a device for serial data transmission over a fiber optic cable, and more particularly, to a digital circuit for converting parallel electrical data into serial optical data for transmission over a fiber optic cable and a digital circuit for converting the serial optical data back to parallel electrical data.

2. Discussion of the Related Art

In high speed digital circuits, data is typically routed between different circuit components in a parallel format in order to reduce the clock rate necessary to effectively transmit the data. When transmitting the data between separate digital circuits or processing units, it is known in the art to use fiber optic links to transmit the data, and thus, realize higher speeds at reasonable costs in the transmission of the data. However, fiber optic data transmission generally requires serial data transmission formats in order to reduce the number of optical cables necessary to transmit the data. Consequently, it is known in the art to incorporate flexible high speed multiplexing schemes to convert high speed parallel data formats into even higher speed serial formats to enable the data to be transmitted along a single or reduced number of fiber optic cables.

As the sophistication of advanced digital processing systems continues to increase, high performance data distribution methods must be developed to meet the requirements of data transmission between multiple processing units. Most of the current data distribution schemes mentioned above are inadequate to support many of the existing data formats, and further, cannot easily expand to meet the demands of future systems. More particularly, these prior art data distribution methods are limited in the ability to transmit data at different rates and word sizes in a practical circuit implementation. Consequently, the ability to transmit serial data at high speeds along a fiber optic cable is limited by the prior art methods of data distribution.

What is needed then is a device for converting parallel data to serial data for fiber optic transmission and back to parallel data again which is highly flexible in that the data can be transmitted at different rates and word sizes. It this therefore an object of the present invention to provide such a device.

SUMMARY OF THE INVENTION

Disclosed is a system for flexible data transmission when converting parallel data to serial data for optical fiber transmission and back to parallel data again. The system includes specific digital circuits incorporating an input conditioner (ICON) for converting the parallel data to serial data and an output conditioner (OCON) for converting the serial data back to parallel data at the end of the transmission. More particularly, the ICON includes an application specific integrated chip (ASIC) including a parallel-to-serial logic circuit for converting the parallel data to serial data, setting serial frames of data, wherein the frames of data include information frame bits, and computing parity; a frequency divider circuit for programmably setting the ratio of the transmission link clock rate to the sample clock rate; a scrambler circuit for making the transmitted serial data more random; and a frame encoder circuit for generating the frame bits.

The OCON also includes an ASIC having a serial-to-parallel conversion circuit for converting the serial data back to parallel data; a frame detecting circuit for removing the frame bits of the transmitted data; a descrambler circuit for descrambling the scrambled data from the ICON ASIC; a frequency divider circuit for selectively setting the sample clock rate with respect to the link clock rate; a channel identification detection circuit for decoding transmitted identification frame bits; a parity checking circuit for recomputing the parity of the transmitted data and comparing it with the parity frame bits transmitted; and a deskew circuit for combining separately clocked data in a multiple OCON configuration. The serial transmission of the data is formatted into a series of frames having a programmable or selectable number of bits. The number of bits is determinable by the ratio of the transmitted link clock rate to the sample clock rate. Each frame of data is preceded by a predetermined frame bit. In one preferred embodiment, a series of four frames is utilized, the first frame including a sync frame bit, the second frame including a first parity frame bit, the third frame including a channel ID frame bit and the fourth frame including a second parity frame bit. By this configuration, the system can convert parallel data to serial data in which the data is administered at different sample rates and word sizes, and can reconvert the serial data into parallel data at the end of the fiber optic transmission.

Additional objects, advantages, and features of the present invention will become apparent from the following description and appended claims, taken in conjunction with the accompanying drawings.

BRIEF DESCRIPTION OF THE DRAWINGS

FIG. 8 shows a parity generator of the parallel-to-serial logic circuit of FIG. 7;

FIG. 12 shows a parity checking logic circuit of the OCON ASIC of FIG. 9;

DETAILED DESCRIPTION OF THE PREFERRED EMBODIMENTS

The following description of the preferred embodiments is merely exemplary in nature and is in no way intended to limit the invention or its application or uses.

Figure 1:
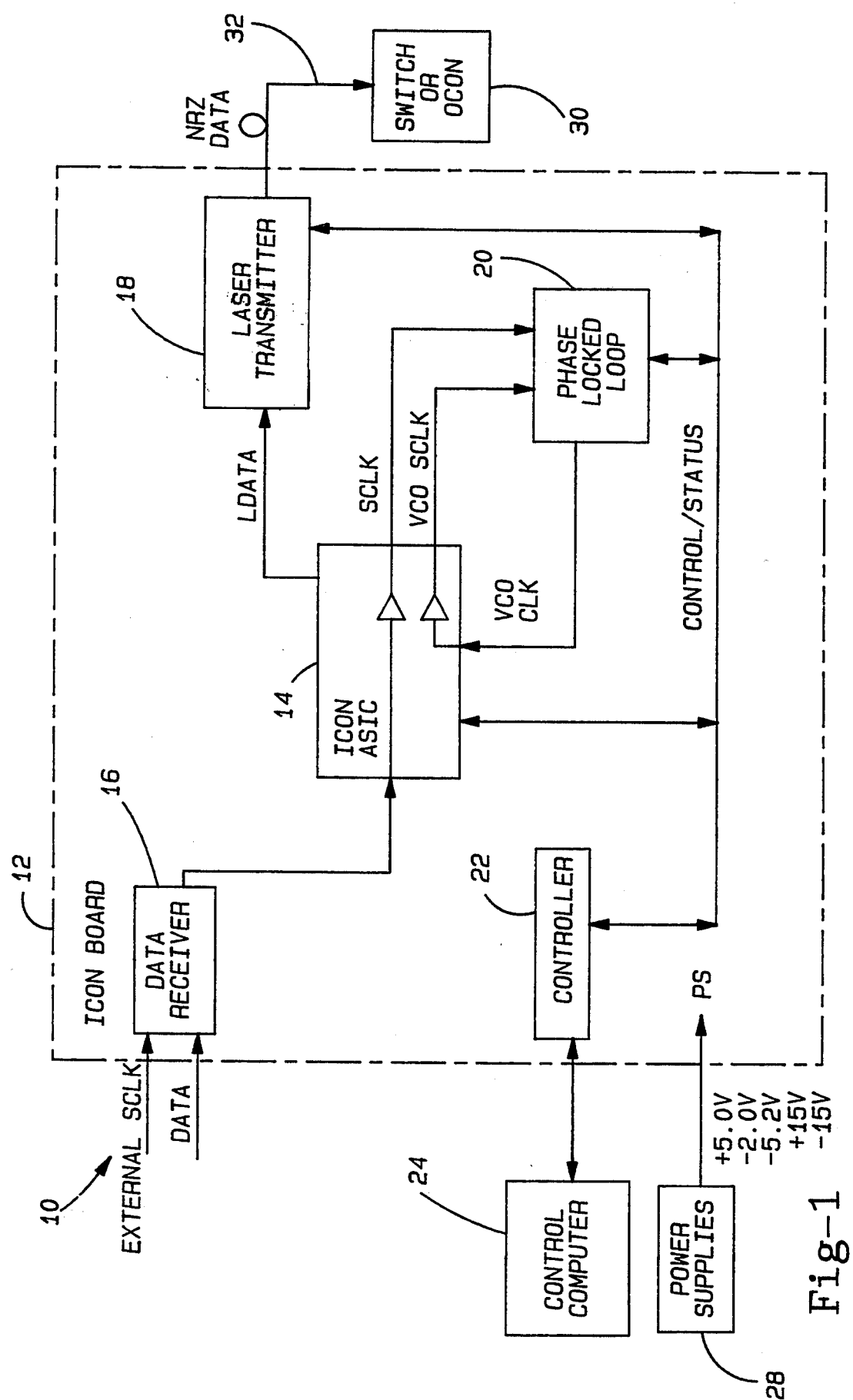
FIG. 1 shows an ICON board in block diagram form according to a preferred embodiment of the present invention.
Figure 2:
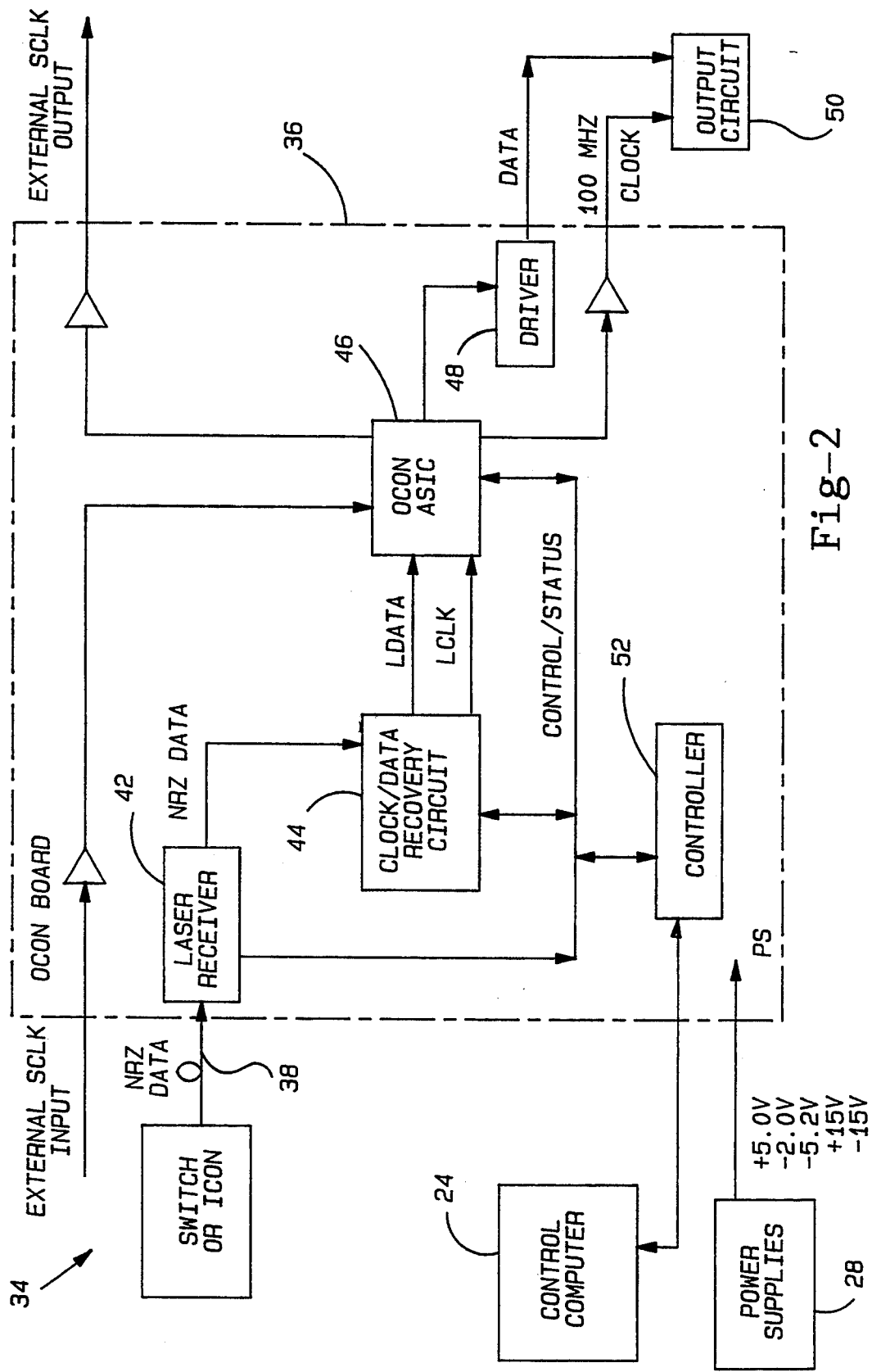
FIG. 2 shows an OCON board in block diagram form according to a preferred embodiment of the present invention.

First turning to FIGS. 1 and 2, two digital circuits, an ICON circuit 10 and an OCON circuit 34, respectively, are shown in block diagram form and may be part of, for example, an ICON/OCON data transmission mainframe (not shown). Such a mainframe may include a plurality of ICON boards 12 and/or OCON boards 36. The remaining peripheral circuits shown in block diagram form in circuits 10 and 34 outside of each ICON board 12 and OCON board 36 may be applicable to more than one ICON board 12 or OCON board 36 and probably are applicable to all of the ICON and OCON circuits of the mainframe. In operation, as will be discussed in detail below, ICON board 12 will receive parallel electrical digital data from a desirable source (not shown) and convert it to serial optical digital data to be transmitted by a fiber optic cable, such as is represented by line 32 leaving ICON board 12, which will transfer non-return to zero (NRZ) data. The ICON and OCON boards have been designed to use the known transmission encoding technique NRZ, but it will be understood that other transmission techniques can be used without serious modifications or departing from the spirit of the invention.

OCON board 36 will receive the NRZ data on fiber optic cable 32, or on a similar fiber optic cable 38, and convert the serial optical digital data back to parallel electrical digital data for appropriate processing. In this manner, it is generally understood that the ICON board 12 and OCON board 36 will not be part of the same ICON/OCON mainframe, but will, in fact, be part of separate mainframes. In such an application where ICON board 12 and OCON board 36 are part of the same mainframe, it is understood that OCON board 36 will be receiving serial data from a remote location, such that some processing can be done on the data in a parallel format and then transmitted to another remote location by means of ICON board 12.

As discussed above for FIG. 1, ICON circuit 10 includes ICON board 12 and a number of specially connected peripheral circuits to perform the parallel to serial conversion. An ICON ASIC 14 represents the heart of ICON board 12. ICON ASIC 14 is (as is OCON ASIC 46 below) generally a GaAs ASIC fabricated by well known methods. ICON ASIC 14 receives a number of digital data signals from a data receiver circuit 16 in a parallel format. The operation of circuit 16 is conventional, and thus, need not be discussed here. In this embodiment each of the different digital data signals are shown on a single input line from data receiver circuit 16 to ICON ASIC 14, but it will be understood that a plurality of data lines will be used to transmit this data. The breakdown of the different digital data bits will be discussed in more detail below. Data receiver 16 receives the data which is to be transmitted from an appropriate system and converts it to a form acceptable by ICON ASIC 14. Once ICON ASIC 14 converts the data into a serial format it is sent along the Ldata line to a laser transmitter 18. Laser transmitter 18 converts the serial electrical signal to a serial optical signal to be sent as a digital light signal over fiber optic cable 32. Fiber optic cable 32 transmits the digital data either to a switching device or directly to an OCON board 30.

In order to make sure that the external sample clock (SCLK) rate at which data receiver 16 receives the sample data is coherent with the link clock (LCLK) rate in which the data is sent along the fiber optic cable, a feedback circuit comprised of a phase locked loop circuit 20 is incorporated. Phase locked loop circuit 20 receives the external sample clock through an appropriate buffer within ICON ASIC 14 as shown. Phase locked loop circuit 20 generates a clocking signal through a voltage controlled oscillator (VCO), which is in effect the link clock (LCLK). This link clock is sent as a feedback signal to ICON ASIC 14 (VCO CLK), as shown. An internal sample clock is generated from the VCO CLK, as will be discussed in detail below. This VCO sample clock (SCLK) is also sent to phase locked loop circuit 20 as the internal clocking rate of ICON ASIC 14 in order to enable phase locked loop 20 to fine tune the VCO CLK at the proper phase. The operation of phase locked loop circuit 20 is known in the art, and therefore, need not be discussed in subsequent detail here.

A microcontroller 22 controls the operation of the different components discussed above. As is apparent, a control/status bus is connected between microcontroller 22 and ICON ASIC 14, phase locked loop circuit 20 and laser transmitter 18 as shown. Microcontroller 22 is also connected to a bus which is in turn connected to a controlling computer 24 external to ICON board 12 which controls operation of a plurality of ICON boards and OCON boards. In addition, a power supply circuit 28 supplies the different rated voltages necessary to operate ICON board 12, as shown.

Returning to FIG. 2, an optical serial digital data signal is sent to OCON board 36 from either an appropriate optical switching device 40 or an ICON board through a fiber optic cable 38. Fiber optic cable 38 transmits the serial optical data from switch 40 to a laser receiver circuit 42 on OCON board 36 as NRZ data. Laser receiver circuit 42 converts the serial optical data back to serial electrical data, by a process well understood to those skilled in the art, and transfers the electrical data along the NRZ data line to a clock recovery circuit 44, also well understood to those skilled in the art, for removing the transmitted linking clocking frequency from the serial data. The serial data is then transferred to an OCON ASIC 46 on a data line separate from the link clock signal, as shown. OCON ASIC 46 converts the serial electrical data back to the parallel electrical data as it was first admitted to the ICON board at the sample clock rate. The parallel data is then sent to a driver circuit 48 in order to drive the output to applicable system components such as an output circuit 50. In addition, a 100 MHz clock rate is also outputted from OCON ASIC 46 for reasons as will be known in the art.

A microcontroller 52 on OCON board 36 controls the operation of laser receiver circuit 42, clock recovery circuit 44 and OCON ASIC 46 through an appropriate bus as shown. Microcontroller 52 receives its command signals from an external computing device 24 as for ICON board 12 above. Also, a power supply circuit 28 supplies the necessary voltages to the components of the OCON board 36, as shown. An external sample clock (EXT SCLK) may also be applied to OCON ASIC 46 for clocking the data out of OCON ASIC 46 for reasons which will become clear from the discussion below.

Figure 3:
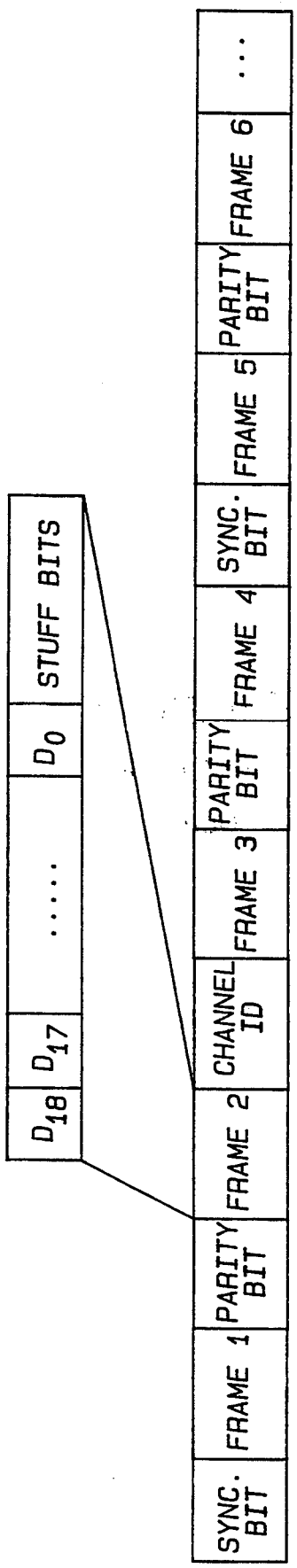
FIG. 3 shows the bit sequence of the serially transmitted data.

Now turning to FIG. 3, the format in which the serial digital data is transmitted is shown. More particularly, the stream of serial data bits is broken up into individual frames of data in which the beginning of each frame includes a single frame bit. For example, if each frame includes a 20-bit word, the beginning bit will be a particular information bit separate from the data being transmitted by the remaining bits in the word. According to one preferred embodiment of the present invention, the information frame bits are repeated in a four frame pattern. The first bit of the first frame includes a synchronization bit which enables OCON ASIC 46 to determine word boundaries within the serialized data stream. The first bit of frame two is a parity bit for monitoring the bit error rate (BER). The parity bit contains the parity of all the bits of the preceding frames one and four. The first bit of frame three is a channel identification (ID) bit which enables OCON ASIC 46 to determine which, if any, ICON ASIC the information is coming from. The first bit of frame four also includes a parity bit which contains the parity of the preceding frames two and three.

As mentioned above, the first bit of frame one is a synchronization (sync) bit. As such, at the beginning of every four frames ICON ASIC 14 inserts an alternating "0" and "1" synchronization pattern into this frame bit location. By this, OCON ASIC 46 can determine the beginning of a sample word sequence. In order for OCON ASIC 46 to get synchronization acquisition, it must receive a proper 32-bit alternating 0-1 sequence in this frame bit location. Consequently, because the sync bit occurs only once in every four frames of data, it takes at least one hundred and twenty-eight frames of data to achieve frame acquisition.

Also, as mentioned above, the bit error rate is monitored by computing the parity across every two frames of data in the ICON and inserting a parity bit at the beginning of the next frame into the serial data stream. Once the data stream is received in OCON ASIC 46, it recomputes the parity at the same two frame intervals and compares the just computed parity bit with the next bit of the next frame. Discrepancies between these two bits are recorded as errors. The bit errors are not counted until frame synchronization is acquired.

Also, as mentioned above, each ICON ASIC 14 is assigned a unique eleven bit channel ID which is transmitted in the serial data stream. The channel ID is inserted one bit at a time at the beginning of frame three. To distinguish the beginning and end of each ID word in the serial data stream, a 13-bit header consisting of 12 "0"s and a consecutive "1" is combined with the original 11-bit ID word. Therefore, it takes 96 continuous frames to send the entire channel ID.

FIG. 3 also shows a bit by bit blow-up of one of the frames, here frame 2. As will be discussed in more detail below, the number of data bits per frame is determined by the ratio of the serial link clock rate to the sample clock rate. If this ratio is less than 20, the least significant bits of each data word will not be transmitted with the frame. If the ratio is greater than 20, a predetermined stuff bit sequence depending on how much the ratio is above 20 will be inserted at the end of the data stream for each individual frame. Generally, the stuff bit sequence is a repeating sequence 001001 . . . It is the addition of the serial stuff bits which enables the system to have high flexibility of word size and rate.

Figure 4:
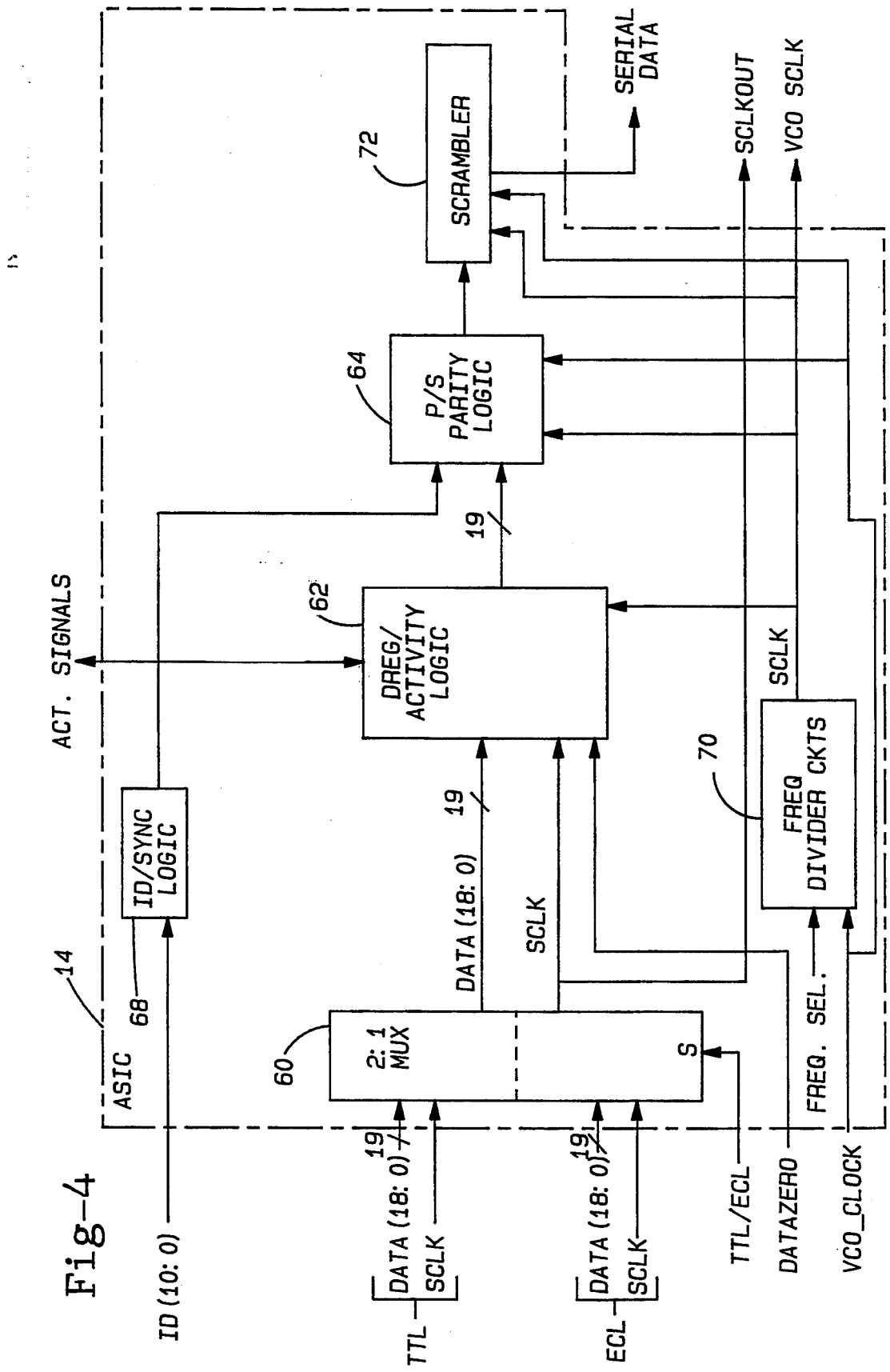
FIG. 4 shows an ICON ASIC of the ICON board of FIG. 1 in block diagram form.

Now turning to FIG. 4, ICON ASIC 14 is shown in a block diagram configuration. More particularly, ASIC 14 includes a 2:1 multiplexer 60 which receives two sets of 20 parallel data bits, one from a transistor transistor logic (TTL) input/output (I/O) circuit and one set from an emitter coupled logic circuit (ECL) I/O, as shown. All of these data lines are received from data receiver circuit 16 of FIG. 1. Each of the two sets of data lines being applied to multiplexer 60 includes a 19-bit data signal and a sample clock input. A TTL/ECL select input applied to multiplexer 60 selects between one set of input lines or the other set such that multiplexer 60 outputs the selected set to subsequent logic components within ASIC 14, as shown. Typically, microcontroller 22 controls the selection of the type of logic circuit.

The set of data lines outputted from multiplexer 60 is applied to a data register and activity logic circuit 62 for at least storing the data for a desirable period. In other words, the data is clocked into data register circuit 62 by the sample clock line from the data source and is stored there to be outputted as parallel data to a parallel-to-serial logic circuit 64 at a separate internal ASIC sample rate set by the VCO discussed above. This internal sample rate is the same as the external sample clock. The operation of the parallel-to-serial logic circuit 64 will be described in more detail hereunder. The data register 62 also includes a data zero input, as labeled, in order to zero out all the data bits into a test mode to speed up the frame synchronization process in the OCON.

Data register 62 further includes a feature which monitors ICON ASIC 14 to determine whether the incoming synchronized data is not being updated regularly. In other words, the data register 62 has a activity latch circuit (not shown) to determine if the data being inputted is being updated at regular intervals. If the activity latch circuit determines that the data is not being appropriately updated, it will send a signal to microcontroller 22 along the ACT. signal line, as shown.

ICON ASIC 14 further includes an ID/synchronization (sync) generation logic circuit 68. ID/sync logic circuit 68 includes an appropriate electrical arrangement of counters and multiplexers for producing an alternating "0" and "1" synchronization bit pattern, and for introducing the sequence of identification bits as discussed above for FIG. 3. ID/sync logic circuit 68 further includes a bit counter to allow the parity bits to be inserted at the beginning of frames 2 and 4. ID/sync logic circuit 68 receives a 11-bit identification input into ASIC 14 from microcontroller 22, and outputs it to parallel-to-serial logic circuit 64 on a bit by bit basis at a rate acceptable for the first bit of frame 3. The specific operation of logic circuit 68 will be discussed in more detail below with reference to FIG. 5.

ICON ASIC 14 additionally includes a frequency divider circuit 70. Frequency divider circuit 70 includes a plurality of divide down circuits which enables the ratio between the link clock and the internal sample clock to be virtually any value desired. The operation of the frequency divider circuit 70 will be discussed in further detail with regards to FIG. 6 below. As is apparent, however, frequency divider circuit 70 receives an input from the VCO CLK of the phase locked loop circuit 20 of FIG. 1, and an 11-bit frequency select signal from microcontroller 22, as shown.

ICON ASIC 14 further includes parallel-to-serial logic circuit 64, as mentioned above. Parallel-to-serial logic circuit 64 receives a single bit input from ID/sync logic circuit 68 and a 19-bit parallel input from data register 62. Parallel-to-serial logic circuit 64 takes the parallel inputs and converts them to a serial data output, as will be described hereunder in particular detail with reference to FIG. 7. As is apparent from FIG. 4, parallel-to-serial logic circuit 64 includes an input from the internal sample clock and the link clock, as shown.

ICON ASIC 14 further includes a scrambler logic circuit 72. Scrambler logic circuit 72 is a circuit which takes the serial data from parallel-to-serial logic circuit 64 and converts it into a pseudo-random configuration of data bits such that the transfer of data has an acceptable number of transitions between 0's and 1's such that the data is effectively transferred when a long sequence of 0's and 1's occurs. In other words, scrambler logic circuit 72 takes the serial data and applies a polynomial generation to the sequence of serial bits to alter their order in a more random fashion to make more transitions between "1"s and "0"s in order to enable the data to be more reliably transmitted. The operation of such a scrambler circuit is known in the art, and therefore, need not be discussed in further detail here.

By looking at FIG. 4 it is apparent that the serial data is outputted from ICON ASIC 14 directly from scrambler 72. Returning to FIG. 1 it is also apparent that this data is then applied to laser transmitter 18 for converting the electrical serial data into optical data serial for transmission along the fiber optical link 32. In addition, it is apparent that ICON ASIC 14 includes a sample clock output and an internal VCO SCLK output as applied to the phase locked loop circuit 20, discussed above.

Figure 5:
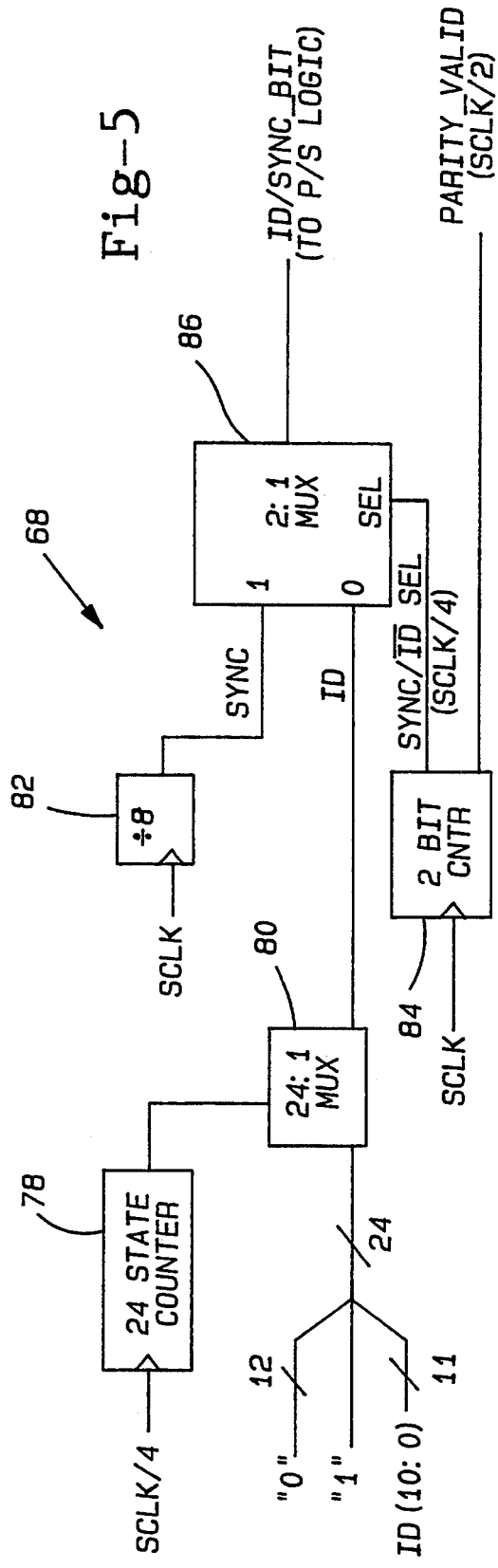
FIG. 5 shows an ID/synchronization generation logic circuit of the ICON ASIC of FIG. 4.

Turning to FIG. 5, the basic components of ID/sync generator logic circuit 68 are shown. These components include a 24 state counter 78, a clocked flip-flop circuit 82, a 24:1 multiplexer 80, a 2:1 multiplexer 86 and a 2-bit state counter 84 electrically connected as shown. Multiplexer 80 has a 24 line parallel input for inputting the ID data and an input from state counter 78 for selecting consecutive ID data lines. The state counter 78 has a clocked input which is at the internal sample clock divided by four. As discussed above, the ID data sequence includes 12 0's, 1—1 and 11 ID bits. In this manner, every four sample clocks state counter 78 will enable multiplexer 80 to output the next consecutive ID data point as a first input to multiplexer 86.

A second input to multiplexer 86 comes from the sync generator of flip-flop circuit 82. Flip-flop circuit 82 inputs an alternating "0" or "1" to multiplexer 86 at the internal sample clock rate. The select input to multiplexer 86 is from 2-bit counter 84 which alternately selects multiplexer 86 to output at the internal sample clock rate divided by four, the ID or sync bit. Alternately, counter 84 gives a parity valid signal, as will be described below. Consequently, 2-bit counter 84 has four states counting consecutively such that the second and fourth state indicate a parity valid state and the first and third state enables multiplexer 86 to alternately select either the sync bit or the identification bit to be output to parallel-to-serial logic circuit 64.

Figures 6, 7:
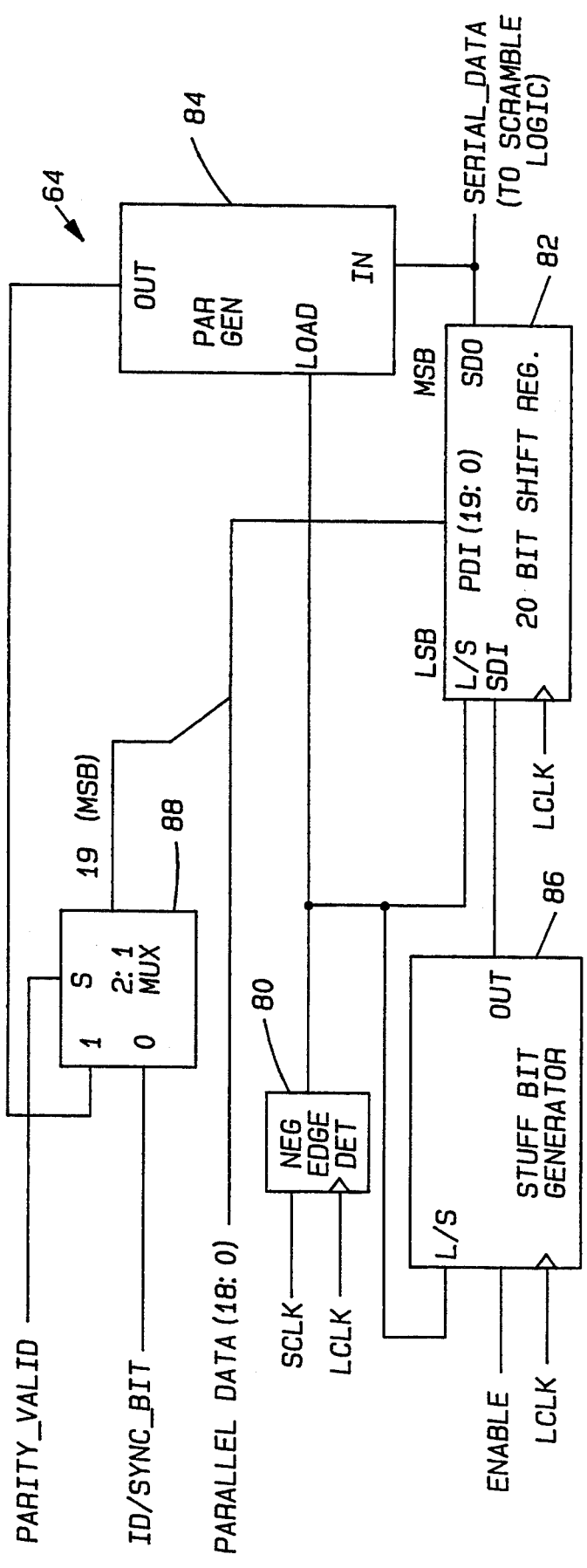
FIG. 6 shows a frequency divider circuit of the ICON ASIC of FIG. 4.
FIG. 7 shows a parallel-to-serial and parity logic circuit of the ICON ASIC of FIG. 4.

Now turning to FIG. 6, the basic components of frequency divider circuit 70 are shown. More particularly, a frequency select line having 11 parallel bits is applied to three divide down counters, a first divide down by 2,3,4,5 counter 72, a second divide down by 2,3,4,5 counter 74, and a divide down by 1, 2, 4, 8 ..., 128 (powers of 2) counter 76. Divide down counter 72 receives two parallel input lines from the frequency select inputs, divide down counter 74 also receives two parallel inputs from the frequency select input lines and divide down counter 76 receives the remaining 7 input lines from the frequency select lines. The frequency select input lines are programmable by microcontroller 22 such that the appropriate set of input signals sets the divide ratio of the frequency divider circuit 70 to a desirable internal sample clock cycle. Along with the frequency select input lines to the divide down counters, an input from a buffer 78 which either applies the VCO clock as the link clock to each of the divide down counters 72, 74 and 76. Consequently, by dividing the link clock by a predetermined value, it is possible to adjust the ratio between the link and sample clock frequencies. As mentioned above, the frequency relationship between the link clock and the sample clock automatically determines the word length of the data, i.e., the number of data bits in each frame. By this, data can be serialized by ICON ASIC 14 at a variety of input clock rates.

Now turning to FIG. 7, the heart of ICON ASIC 14 is shown. More particularly, the basic components of parallel-to-serial and parity logic circuit 64 is shown. By briefly reviewing FIG. 4, it is clear that parallel-to-serial logic circuit 64 receives an internal sample clock input and a VCO link clock input from frequency divider circuit 70, the 19-bit parallel input from data register 62 and the ID or sync bit from ID/sync logic circuit 68. The internal SCLK and the LCLK are applied as inputs to a negative edge detector circuit 80. Detector circuit 80 monitors the negative edge of the internal sample clock pulses and outputs a load signal to a parity generator circuit 84, a load/shift (L/S) signal to a 20-bit shift register 82 and a L/S signal to a stuff bit generator 86 for reasons which will be discussed below. Negative edge detector circuit 80 is run at the high speed serial link clock rate.

Shift register 82 receives the 19-bit parallel data input from data register 62 and the frame bit from a 2:1 multiplexer 88. Multiplexer 88 selects the ID or sync frame bit from ID/sync generator circuit 68, and more particularly, the 2:1 multiplexer 86 of FIG. 5 as discussed above. The parity valid input from counter 84 is applied as the select line of multiplexer 88. When the parity valid select is enabled, the output of multiplexer 88 is the parity bit from parity generator 84, the operation of which will be discussed below. Consequently, shift register 82 receives the 19-bit parallel input from data register 62 and the appropriate frame bit as the most significant bit (MSB) at the clock rate as discussed above for detection circuit 80. Shift register 82 then outputs the parallel input data in a serial fashion at the link clock rate.

As the data is being loaded in a parallel fashion into shift register 82, at the internal sample clock rate, it is being serially outputted at the link clock rate. Since register 82 is a 20-bit register, more than the 20 input bits will be shifted out if the ratio of the link clock to the serial clock is greater than 20. If this ratio is greater than 20, stuff bit generator 86 will output a predetermined sequence of bits (001001001 ...) after the data is shifted out of shift register 82 through the serial data in (SDI) input port at the link clock rate. Stuff bit generator 86 is a three bit circular shift register which is initialized to be "001" when it receives a load signal from edge detection circuit 80. If the ratio of the link clock to the internal sample clock is equal to or less than 20, then the stuff bits do not get inputted into shift register 82 because the parallel data will be loaded prior to, or at, 20 shifts thus overriding the stuff bits. The enable line of stuff bit generator 86 provides the "1" bit of the stuff bit sequence.

As the serial data is transferred out of shift register 82 to scrambler circuit 72, as discussed above, it is also output to parity generator 84 in order to generate parity on two consecutive words of serial data to be multiplexed with the ID or sync bit by multiplexer 88, as also discussed above. Parity generator 84 separates the words by a signal on the load input from edge detection circuit 80. Turning to FIG. 8, the components of parity generator 84 of FIG. 7 are shown. Parity generator circuit 84 generates even parity in that the parity bit is set to "1" if there is an odd number of 1's in the serial data stream of two consecutive words from shift register 82 resulting in an even total number of 1's.

Parity generator circuit 84 includes a parity accumulator circuit 88, a first parity holding register 90, a second parity holding register 92 and an exclusive-OR gate 94. Parity accumulator circuit 88 receives the serial data stream from shift register 82 and calculates the parity over the serial data word by administering the serial stream to an exclusive-OR gate (not shown) at the link clock rate and then to a latch (not shown) in order to feed back a delayed signal to the exclusive-OR gate, and thus exclusive-OR consecutive data points together. Each of the parity accumulator 88, first parity register 90 and the second parity register 92 have a sample clock input which is enabled at the negative edge of the clock pulse. After each negative edge clock pulse, the parity output to the first parity holding register 90 is loaded at the same time as the parity accumulator is reset. In addition, the second parity holding register 92 is loaded with the parity bit which was in the holding register 90 at the previous sample clock cycle. The two parity bits in registers 90 and 92 are exclusively-ORed together by exclusive-OR gate 94, the outcome of which is output to multiplexer 88 as the parity bit of two consecutive data words as discussed above.

Figure 9:
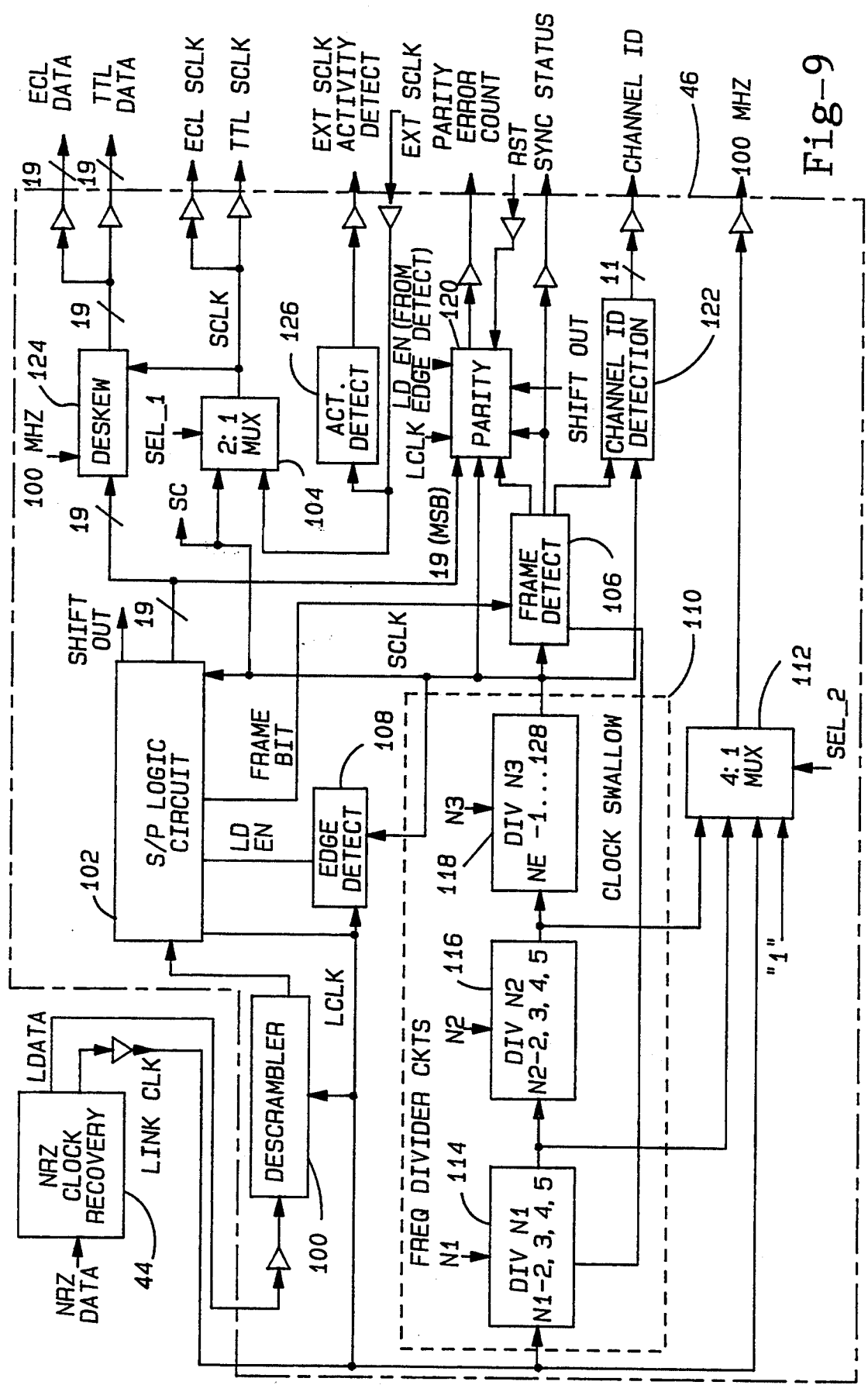
FIG. 9 shows an OCON ASIC of the OCON board of FIG. 2 in block diagram form.

Now turning to FIG. 9, the individual components of OCON ASIC 46 are shown. As discussed above, a clock recovery circuit 44 receives the serial electrical NRZ data from laser receiver circuit 42 and separates the serial data from the link clock rate, as shown. The serial data is first applied to a descrambler circuit 100 in order to convert the scrambled data back into its original pattern before it was scrambled by scrambler circuit 72 of FIG. 4. The output of descrambler circuit 100 is sent as serial data to a serial-to-parallel conversion logic circuit 102 for converting the serial data back into parallel data for subsequent processing. The parallel data, except for the frame bit, from the serial-to-parallel logic circuit 102 is applied to a deskew circuit 124 for enabling the data to be clocked out of ASIC 46 by either an internally generated sample clock or an externally generated sample clock and also to a parity checking logic circuit 120 for recomputing the parity of every two data words.

The link rate clock signal from clock recovery circuit 44 is applied to an edge detection circuit 108, a frequency divider circuit 110, descrambler circuit 100 and a 4:1 multiplexer 112. Frequency divider circuit 110 includes three divide down counters 114, 116 and 118 operating in the same fashion as the divide counters of frequency divider circuit 70 of ICON ASIC 14, as discussed above. Frequency divider circuit 110 uses these divide down counters for generating the sample clock of OCON ASIC 46 from the link clock. The link clock and the sample clock from frequency divider circuit 110 are applied to an edge detection circuit 108 to determine the negative edge of the sample clock at the link clock rate. The output of edge detection circuit 108 is applied to serial-to-parallel logic circuit 102 for reasons which will become apparent below.

The sample clock rate outputted from frequency divider circuit 110 is also applied to a frame detection circuit 106. Frame detection circuit 106 further accepts the frame bit from serial-to-parallel logic circuit 102 and determines the synchronization frame bits of the input data, and thus, monitors the established sync acquisition. Once the position of the sync bit is determined, the other frame bits will be known. From frame detection circuit 106, the parity bits are output to a parity error count circuit 120 and the channel ID bits are output to a channel ID detection circuit 122.

As mentioned above, OCON ASIC 46 receives an external clock source such that the parallel data from deskew circuit 124 can be output at a clock rate equal to that generated by frequency divider circuit 110 but out of phase, thus, enabling the OCON to be combined with the data from other OCONs. The external sample clock input is applied to a 2:1 multiplexer 104 and to an activity detection circuit 126. Multiplexer 104 selects one of either the external sample clock or the internal ASIC sample clock generated by frequency divider circuit 110 by microprocessor 52 and applies it to deskew circuit 124 as will be discussed in further detail below. Activity detection circuit 126 is a monitoring tool by which it can be determined whether the external sample clock is going through transitions, and thus is working. The output of activity detection circuit 126 is applied to microprocessor 52. Also applied to microprocessor 52 is a parity error count from parity logic circuit 120, as well as the sync status signal from frame detection circuit 106 and the channel ID code from channel ID detection circuit 122. In addition, a 100 MHz output is taken from a 4:1 multiplexer 112. The inputs from multiplexer 112 come from the clock output of clock recovery circuit 44, the output from the divide counter 114, the output from the divide counter 116, or a high output "1" In this manner, a 100 MHz signal can be selected if desired.

Figure 10:
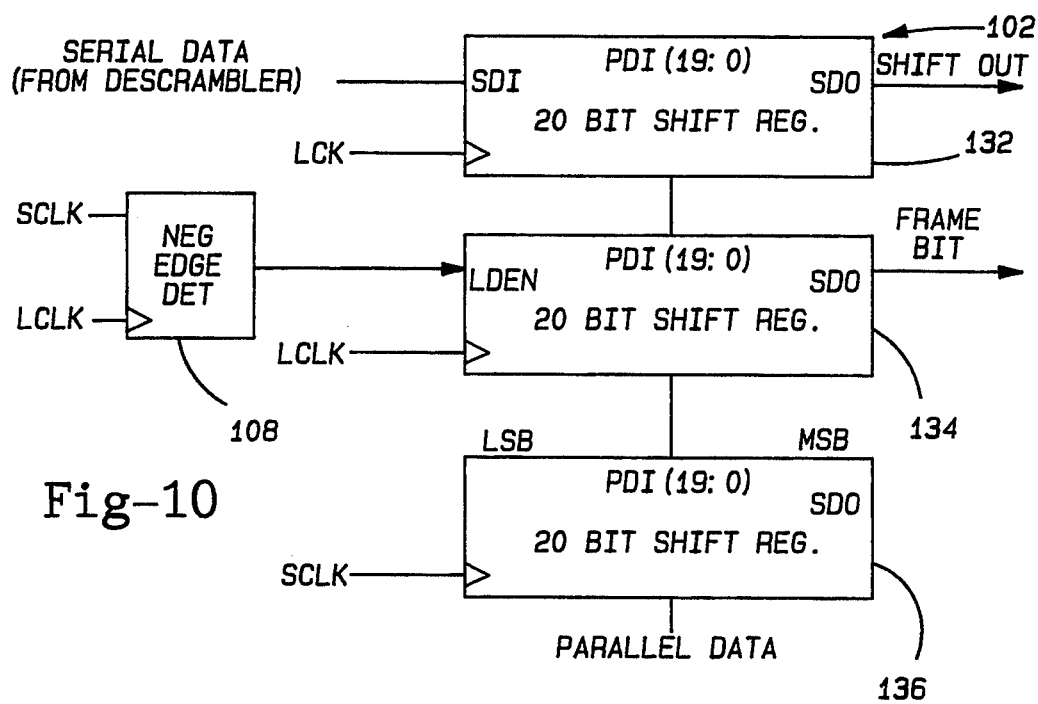
FIG. 10 shows a serial-to-parallel conversion logic circuit of the OCON ASIC of FIG. 9.

Now turning to FIG. 10, the individual components of serial-to-parallel logic circuit 102 are shown. More particularly, serial-to-parallel logic circuit 102 includes a first 20-bit shift register 132, a second 20-bit shift register 134, and a third 20-bit shift register 136. Edge detection circuit 108 is also shown in FIG. 10. The serial data from descrambler circuit 100 is applied to the serial data in (SDI) port of first shift register 132 at the link clock rate. Serial bits from shift register 132 are then loaded into shift register 134 in a parallel fashion at the parallel data in (PDI) port at a rate determined by the load enable (LDEN) line from edge detector circuit 108. In other words, the parallel data is read out of shift register 132 on the negative edge of the sample clock into register 134. At each link clock pulse the most significant bit in register 134 is output at the serial data out (SDO) port as the frame bit. Since register 134 is a 20-bit shift register, as the parallel data is being input into register 134 from shift register 132 the least significant bits are written over by the most significant bits such that the stuff bits are lost if they have been included in the serial sequence. Shift register 136 transfers the parallel data out at the sample clock frequency.

Figure 11:
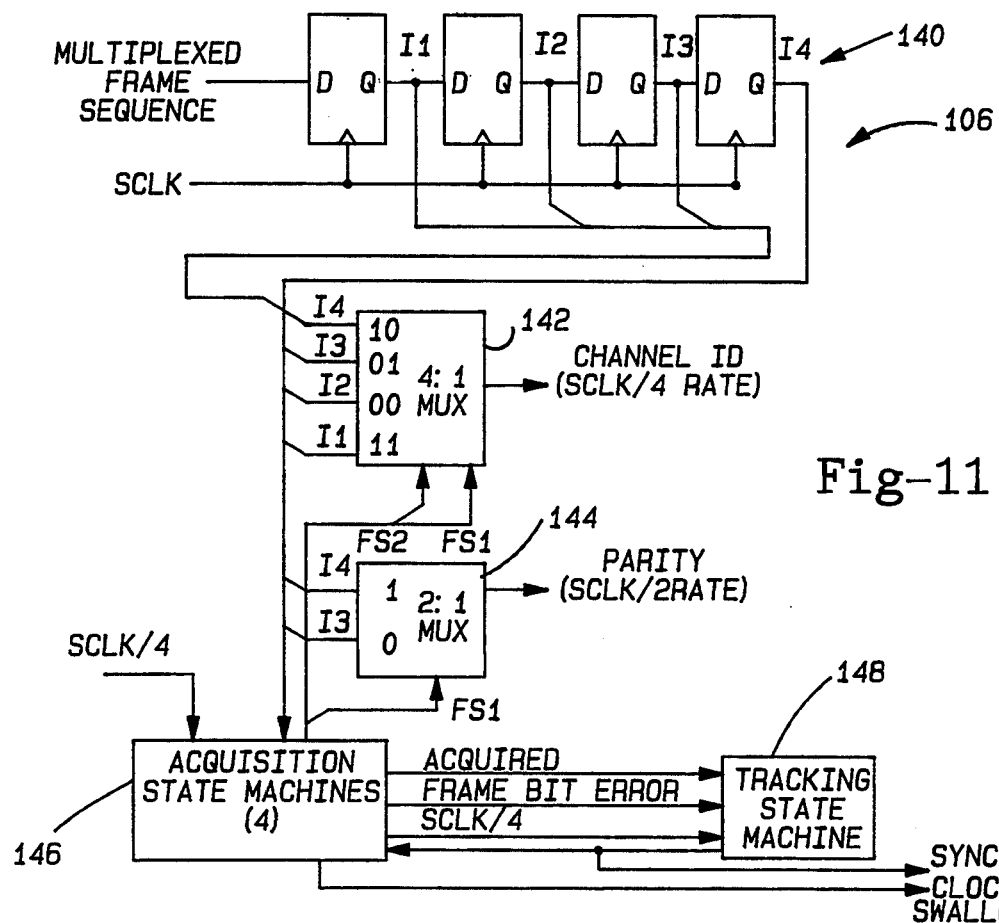
FIG. 11 shows a frame detection circuit of the OCON ASIC of FIG. 9.

Now turning to FIG. 11, the basic components of frame detection logic circuit 106 are shown. Frame detector logic circuit 106 receives as an input the frame bit from register 134 of serial-to-parallel logic circuit 102 as discussed above. This frame bit is input into a series of four slave state latches generally depicted as a slave state machine 140. Each of the slave state latches has an output I1, I2, I3 and I4. As the frame bit is inputted into the slave state latches, it is transferred from the left farthest state latch to the next consecutive three latches at the sample clock frequency. Each of the outputs I1–I4 of the latches are applied to an acquisition state machine circuit 146 having four individual acquisition state machines (not shown). The acquisition state machine circuit 146 is configured to look for the 32-bit alternating 0-1 sequence of sync frame bits in order to determine sync acquisition. Since the sync bit is only one bit of the four frame bits, the acquisition state machines are loaded at a rate of the sample clock divided by four as shown.

If consecutive sets of frame bits, having been introduced into acquisition state machine circuit 146, do not match the alternating 0-1 sequence indicating sync acquisition, circuit 146 generates a clock swallow signal on the output line indicated. The clock swallow signal is applied to an input to the first counter 114 of frequency divider circuit 110, of FIG. 9. This clock swallow signal instructs frequency divider circuit 110 to freeze its operation for one link clock signal such that the next frame bit which is input into slave state machine 14 will be delayed one bit such that a different alternating four frame bit pattern is input into circuit 146. This process is continued until acquisition state machine circuit 146 does indicate that the 32-bit sequence of 0-1's are present. Sync acquisition is indicated on the "acquired" output line of acquisition state machine circuit 146. A tracking state machine circuit 148 continuously monitors the sync acquisition on the "acquired" line and gives a sync signal to microprocessor 52 on the sync output line from tracking state machine circuit 148.

Once sync acquisition is attained, circuit 146 will know which one of the four outputs, I1–I4, of slave state machine circuit 140 is the sync bit. Consequently, since one of the four bits will be the channel ID bit and the remaining two bits will be parity bits in a known order, a 4:1 multiplexer 142 is used to output the channel ID bit and a 2:1 multiplexer 144 is used to output the parity bits. Multiplexer 142 receives each of the latch outputs I1–I4 from slave state machine circuits 146. Therefore, two select lines are needed from acquisition state machine circuit 146 since it is unknown which state acquisition machine in circuit 146 will actually have the sync bit. Likewise, a single select line is input into multiplexer 144 to output one of either I3 or I4 as the parity bit since there are two parity bits in the four frame bit sequence.

As acquisition state machine circuit 146 monitors the sync acquisition through the operation of OCON board 46, occasionally an error will be generated in the sync sequence of 0s and 1s. If such a bit error occurs, tracking state machine 148 will keep acquisition state machine circuit 146 from indicating loss of sync unless the bit error persists.

Now turning to FIG. 12, the basic individual components of parity checking logic circuit 120 are shown. Parity checking logic circuit 120 receives the most significant bit (MSB) of the 19-bit data word in shift register 132 through the serial data out (SDO) port, and the parity bit output bit from multiplexer 144 of FIG. 11. Parity bit logic circuit 120 recomputes the parity of every two data words in order to compare the newly acquired parity with the transmitted parity bit from ICON ASIC 14. As with parity generator circuit 84 of FIG. 8, parity checking logic circuit 120 includes a parity accumulator, here comprised of an exclusive-OR gate 150, an AND gate 152 and a latch 154. Exclusive-OR gate 150 receives the MSB input and exclusively-ORs this with the MSB bit stored in latch 154 at the negative edge of the sample clock determined by AND gate 152 as shown. The parity of the first word is stored in a first parity latch 156. First parity latch 156 has an output to a second parity latch 158 after an edge detection clock cycle. The outputs of latches 156 and 158 are stored parity bits of adjacent words and are exclusively-ORed in exclusive-OR gate 160 in the same manner as discussed above for FIG. 8 in order to recompute the parity of the data.

In order to compare the recomputed parity bit with the transmitted parity bit to determine if a parity error has occurred, the output of exclusive-OR gate 160 is transferred to a second exclusive-OR gate 162 after being delayed by latching circuit 161 two sample clock cycles. The parity bit from multiplexer 144 is exclusively-ORed with the recomputed parity bit in gate 162, and delayed by latch 164 before being applied to an AND gate 166. To determine if a parity error has occurred, the sync bit is first logically ANDed with the output of latch 164. AND gate 166 ANDs the output of latch 164 with the sync bit from tracking circuit 106 to prevent errors from accumulating prior to sync acquisition. If a bit error has occurred, it is counted by counter 168 up to 255. In addition, the counter contains an overflow bit which if activated, will freeze the counter from counting. The parity error count is sampled and reset by microprocessor 52.

Figure 13:
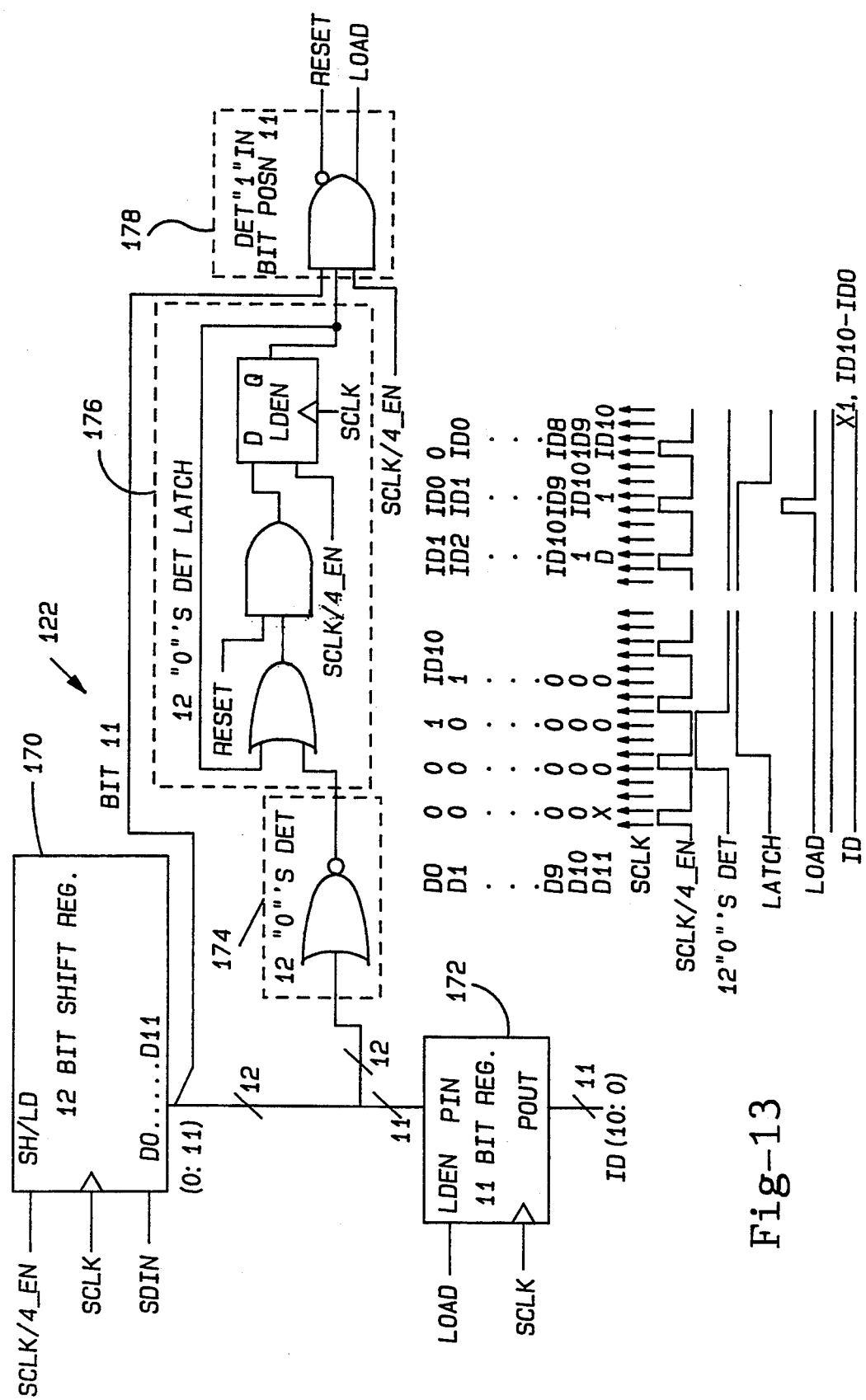
FIG. 13 shows a channel ID detection circuit of the OCON ASIC of FIG. 9.

Now turning to FIG. 13, the basic components of channel ID detection circuit 122 are shown. Once sync acquisition has been indicated as discussed above, the channel ID bit is input at a rate of the sample clock divided by four through multiplexer 142 of frame detection logic circuit 106. These ID bits are input into a 12-bit shift register through the serial data in (SDI) port as the shift/load of register 170 is performed. Twelve bits of data are shifted out of register 170 in a parallel fashion, the first eleven of those bits being applied as parallel data in (PDI) to an 11-bit register 172. Likewise, all of the 12 parallel bits being output from shift register 170 are input into a NOR gate circuit 172 which indicates a high if all of the 12 inputs are "0". Once a high is generated on the NOR output, a detection latch circuit 176 is used to maintain the 12 zero detection. A high input from detection latch circuit 176 is applied to an AND gate detection "1" circuit for detecting the next bit following the 12 "0" bits from shift register 170 to determine if a "1" bit is indeed following the 12 zeros. If this fact is true, AND gate detection circuit 178 outputs a high signal as a load command to 11-bit register 172 in order to load the next 11-bits following the 1-bit as the channel ID bits. 11-bit register 172 has an 11-bit parallel output to microprocessor 52 such that microprocessor 52 can determine which, if any, ICON the OCON is receiving its signals from.

Figure 14:
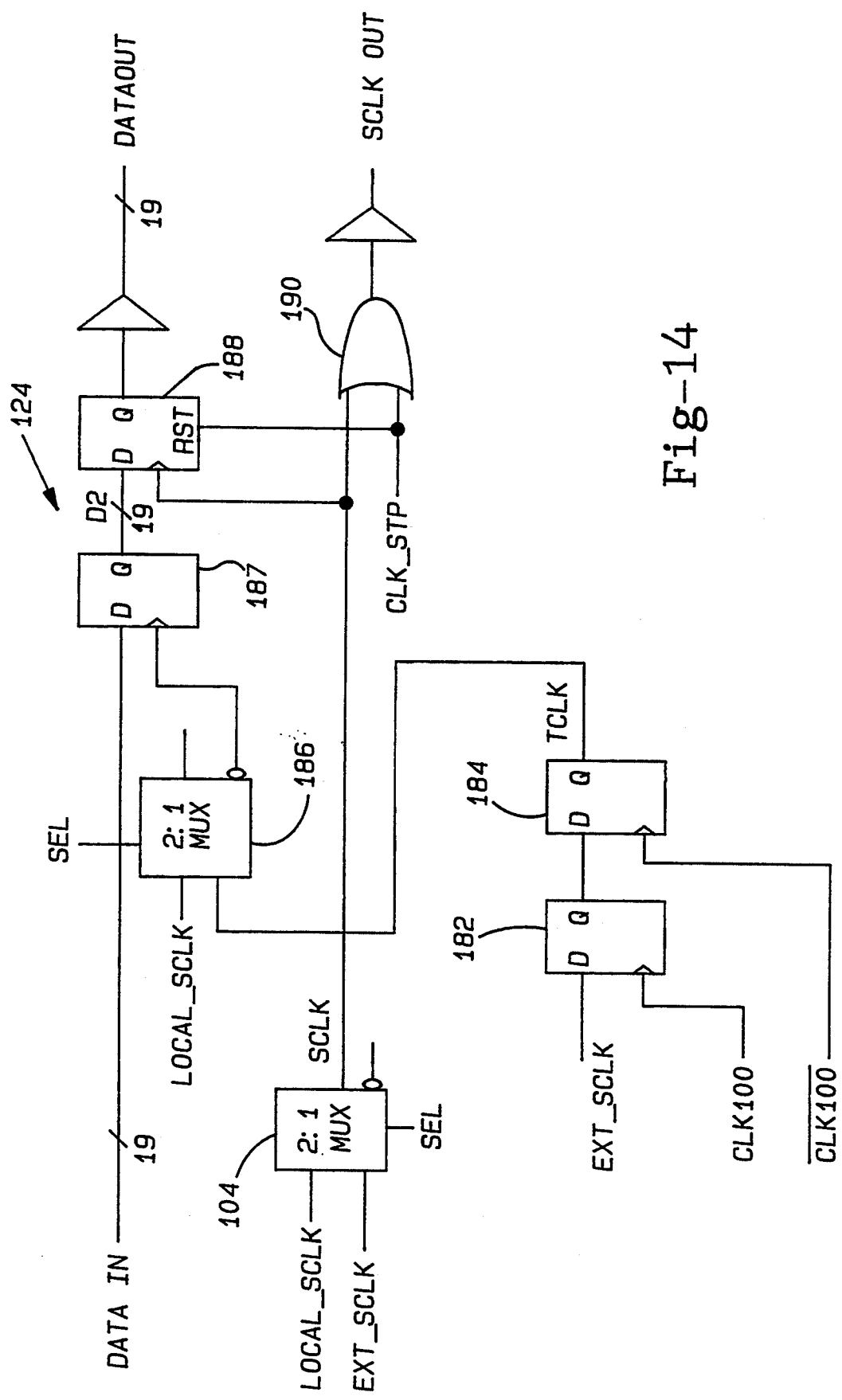
FIG. 14 shows a deskew circuit of the OCON ASIC of FIG. 9.

Now turning to FIG. 14, the basic individual components of deskew circuit 124 are shown. As was briefly discussed above, deskew circuit 124 enables the parallel data being output from OCON ASIC 46 to be clocked out at either the internally generated sample clock rate (divided down from the link clock rate) of OCON ASIC 46 or at an arbitrarily phased external sample clock rate having the same rate as the internally generated sample clock. In other words, deskew circuit 124 enables the phase of the data as it is being input to be synchronized to an external sampling frequency such that the data is outputted from OCON ASIC 46 at the external sample clock phase.

As mentioned above, 2:1 multiplexer 104 selects between the internal or local sample clock (LOCAL SCLK) or the external clock by a select line from microcontroller 52. If the local sample clock is selected, the 19-bit data signal being input into register 188 from register 187 is easily clocked out by the output of multiplexers 104 and 186, as shown. If an external sample clock is chosen, the arbitrary phase must be accounted for. Because the phase relationship between data from the serial-to-parallel circuit 102 and the external sample clock is arbitrary, register 187 is incorporated in deskew circuit 124 in order to prevent possible setup/hold time violations on the output register 188 as will be discussed below.

For most OCON applications, the external sample clock will not be used in applications above 25 MHz. Therefore, a 100 MHz CLK, taken from multiplexer 112 discussed above, is used to generate a transition clock (TCLK) since the 100 MHz CLK is at least four times as fast as the external sample clock and is synchronous (in phase) with respect to the internal sample clock. By clocking the external sample clock through register 182 with a clock at least four times as fast (CLK 100) to generate the transition clock, it is assured that data out of register 187 in deskew circuit 124, clocked by TCLK, does not violate any setup/hold times in the output register 188 (regardless of the phase of the external sample clock) and at the same time, no setup/hold time violations will occur going from serial-to-parallel logic circuit 102 to register 187 in deskew circuit 124. OR-gate 190 is included to hold the SCLK OUT line to "1" and the DATA OUT to all 0's if desired.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims:

What is claimed is:

1. A digital circuit for converting an electrical parallel digital data signal to an electrical serial digital data signal for transmission of the data, said circuit comprising:

a microcontroller for controlling the operation of the digital circuit; and an input conditioner circuit including a parallel-to-serial logic circuit for converting electrical parallel data into electrical serial data, said parallel-to-serial logic circuit including a parallel-to-serial shift register for accepting parallel data at a sample clock rate and emitting serial data at a link clock rate, said input conditioner circuit further including a frequency divider circuit, said frequency divider circuit including three divide down counters selectively programmable by the microcontroller for dividing down the link clock rate to the sample clock rate in a desirable fashion such that the number of serial data bits per data word being shifted out of the parallel-to-serial shift register is selectively set to a particular data word length by the ratio of the link clock rate to the sample clock rate, wherein a first divide down counter accepts two parallel select lines from the microcontroller, a second divide down counter also accepts two parallel select lines from the microcontroller and a third divide down counter accepts seven parallel select lines from the microcontroller, said link clock signal being input into the first divide down counter and said sample clock being output from the third divide down counter.

2. The digital circuit according to claim 1 further comprising an identification and synchronization logic circuit accepting a predetermined identification digital signal from the microcontroller, said identification and synchronization logic circuit further generating an alternating "0" and "1" synchronization bit pattern and selectively alternating between the alternating sync bit pattern and the predetermined identification bit, said identification and synchronization logic circuit outputting the identification and sync bit pattern to the parallel-to-serial logic circuit.

3. The digital circuit according to claim 2 wherein the identification and synchronization logic bit circuit further includes a 2-bit counter, said 2-bit counter selecting the alternating sequence between the sync bit pattern and the identification bit or admitting a parity valid signal to the parallel-to-serial logic circuit, said identification and synchronization logic circuit further including means to select as the identification digital signal an 11-bit identification signal from the microcontroller preceded by a string of twelve "0" bits and a "1" bit.

4. The digital circuit according to claim 1 further comprising an activity logic circuit for monitoring the rate the data is input into the input conditioner circuit and generating an activity signal to the microcontroller in the event the input data is not updated.

5. The digital circuit according to claim 1 wherein said parallel-to-serial logic circuit further includes a stuff bit generator circuit, said stuff bit generator circuit being a circular register generating a predetermined stuff bit combination and emitting the stuff bit combination to the parallel-to-serial shift register as a serial data input such that if the serial data output of the parallel-to-serial shift register exceeds the load rate of the parallel data into the parallel-to-serial shift register, the stuff bit combination will be serially output at the end of the parallel data input.

6. The digital circuit according to claim 5 wherein the parallel-to-serial shift register is a 20-bit shift register such that if the ratio of the link clock to the sample clock is greater than 20 the stuff bit combination from the stuff bit generator will be output to the 20-bit shift register and if the link clock rate to sample clock rate ratio is less than 20, only that number of bits will be serially output from the 20-bit parallel-to-serial shift register.

7. The digital circuit according to claim 5 wherein the parallel-to-serial logic circuit further includes a parity generator logic circuit which receives the serial data from the parallel-to-serial shift register and calculates the parity of two consecutive data words output from the parallel-to-serial shift register at the sample clock rate, said parity generating logic circuit outputting a parity generated bit to a parity bit selecting circuit, said parity selecting circuit also receiving an identification and synchronization bit as an input and outputting an alternating sequence of synchronization bit, parity bit, identification bit, parity bit as the most significant bit to a 19-bit parallel data word being input into the parallel-to-serial logic circuit.

8. The digital circuit according to claim 7 wherein the parity generating logic circuit includes a parity accumulator for generating the parity bit of a sample word, a first parity storing register for storing the parity bit from the accumulator, a second parity storing register for storing a parity bit being output from the first parity storing register and an exclusive-OR gate for exclusively ORing the output from the first parity holding register and the second parity holding register to generate the parity bit of the two consecutive data words.

9. The digital circuit according to claim 7 further comprising a phase locked loop tracking circuit for accepting the sample clock frequency from the frequency divider circuit and generating the link clock rate to be in phase with the sample clock rate, said phase locked loop outputting the link clock rate to the frequency divider circuit.

10. The digital logic circuit according to claim 1 further comprising a scrambler logic circuit, said scrambler logic circuit accepting the electrical digital data from the parallel-to-serial logic circuit and applying a polynomial pseudo-random generator to the data in order to randomize the data causing more transitions, said scrambler logic circuit outputting scrambled serial data to the laser transmitter circuit.

11. The digital circuit according to claim 1 further comprising a laser transmitter circuit, said laser transmitter circuit accepting the serial electrical data signal and converting it to serial optical data signal for transmission along a fiber optic length.

12. A digital circuit for converting serial data bits into parallel data bits, said circuit comprising:
a clock recovery circuit for separating a link clock rate from the serial data bits, said serial data bits including data words where the length of the data words is set by the ratio of the link clock rate to a clock rate of a parallel-to-serial digital circuit sending the serial data bits;
an output conditioner circuit including a serial-to-parallel logic circuit and a frequency divider circuit, said frequency divider circuit receiving the link clock rate from the clock recovery circuit and dividing it down into a desirable sample clock rate, said serial-to-parallel logic circuit including a plurality of shift registers, a first shift register receiving serial data at the link clock rate and a second register shifting out parallel data at the sample clock rate, said output conditioner circuit further including an edge detection circuit, said edge detection circuit receiving the link clock rate and the sample clock rate and detecting the edge of the sample clock signal, said edge detection circuit emitting a load enable signal to a third shift register in the serial-to-parallel logic circuit, said third shift register receiving parallel data bits from the first shift register and outputting parallel data bits to the second shift register, said third shift register further outputting a frame bit to a frame detection circuit; and a microcontroller for controlling the operation of the digital circuit.

13. The digital circuit according to claim 12 wherein the frame detection circuit includes a plurality of slave state machines and acquisition state machines, a first of the slave state machines receiving a frame bit input from the parallel-to-serial logic circuit and outputting the frame bit to subsequent slave state machines at the sample clock frequency, each of the slave state machines having an output, wherein the outputs of each slave state machine are applied as inputs to the acquisition state machines at a range of the sample clock divided by four such that each of the acquisition state machines determines if the output of each slave state machines is an alternating sequence of "0" and "1" frame sync bits, wherein at the end of a predetermined number of clock cycles if none of the acquisition state machines has counted a predetermined number of alternating "0" and "1" sync bits then the acquisition state machines generate a clock swallow output to the frequency divider circuit in order to freeze the divider circuit one link clock period.

14. The digital circuit according to claim 13 wherein the frame detection circuit includes four slave state machines and four acquisition state machines to determine a predetermined sequence of 32 alternating zero and one sync bits for determining sync acquisition, said frame detection circuit further including a tracking state machine generating a sync acquisition signal to the microcontroller and tracking the sync acquisition of the acquisition state machine such that a predetermined number of frame bit errors will not throw off sync acquisition, said frame detector circuit further including a first selecting circuit for selecting one of the outputs from the four slave state machines as a channel identification frame bit and a second selecting circuit for selecting two of the four outputs of the slave state machines as parity frame bits.

15. The digital circuit according to claim 13 further including a channel identification detection circuit receiving a channel identification frame bit from the frame detection circuit in a serial fashion, said channel ID detection circuit including a channel ID shift register for outputting the serial channel ID bits in a parallel fashion, a predetermined number of parallel frame bits from the channel ID shift register being input to a first detection circuit for detecting a sequence of a predetermined number of zero bits, a predetermined number of parallel frame bits from the channel ID shift register being input into a second detection circuit for detecting a one bit after the sequence of zero bits, said second detection circuit outputting a load signal to a channel ID bit register for loading a predetermined sequence of bits after the determination of the sequence of zeros and ones.

16. The digital circuit according to claim 12 further comprising a parity logic circuit for computing the parity of the digital data signal, said parity logic circuit including first circuit means for determining the parity of consecutive words of data and parity comparison means for comparing the computed parity with a parity bit from the serial-to-parallel logic circuit, in order to establish a compared parity bit, said parity logic circuit further including second circuit means for comparing the compared parity bit with a sync bit from said serial-to-parallel logic circuit and a counter for counting parity error counts.

17. The digital circuit according to claim 12 further comprising a deskew circuit, said deskew circuit accepting the parallel digital data from the serial-to-parallel logic circuit and clocking the data out of the output conditioner circuit at a clock rate from either the internal sample clock rate or an external sample clock rate.

18. The digital circuit according to claim 17 wherein the output conditioner circuit further includes an activity detection circuit for determining if the external sample clock rate being input into the output conditioner circuit is generating transitions.

19. The digital circuit according to claim 12 further comprising a descrambler circuit, said descrambler circuit accepting the serial electrical digital data from the clock recovery circuit and returning the data to its original unscrambled form before it was scrambled prior to transmission.

20. The digital circuit according to claim 12 further comprising a laser receiver circuit, said laser receiver circuit receiving the serial data bits as serial optical data bits and converting it to electrical data bits.

21. A method of converting a parallel electrical data bit signal to a serial optical data bit signal having high flexibility in frequency sample rates and word sizes, said method comprising the steps of:

introducing a parallel electrical data bit signal to an input conditioner circuit at an external data clock sample rate;

generating an internal sample clock rate and a transmission link clock rate in phase with the external sample clock rate by means of a phased locked loop circuit, said step of generating an internal sample clock rate includes the steps of applying a voltage controlled oscillator clock from the phase locked loop circuit to a frequency divider circuit to divide the voltage controlled oscillator clock down to the internal sample clock rate, said step of applying the voltage controlled oscillator clock to a frequency divider circuit includes applying a frequency select input to the frequency divider circuit to selectively set the ratio between the link clock rate and internal sample clock rate;

applying the parallel data bit signal to a parallel-to-serial logic circuit for converting the parallel digital data signal to a serial digital data signal, said parallel-to-serial data signal circuit including an output of serial data divided up into individual frames of data, each individual frame of data having an information frame bit and a desired data word length selectively set by the ratio of the link clock rate to the internal sample clock rate, wherein if the ratio exceeds a predetermined number of bits a stuff bit generator will add a predetermined sequence of stuff bits to the serial data stream being output; and applying the serial data from the parallel-to-serial logic circuit to a laser transmitter circuit for converting the electrical serial data signal to the optical serial data signal.

22. The method according to claim 21 wherein the step of separating the parallel data signal into frames of serial data includes developing a four frame sequence of serial data bits wherein the frame bit of each frame includes a particular information bit, one of those frame bits being a synchronization bit, a second and fourth frame bit being a parity bit set from the determination of parity of two consecutive frames of data and a third frame bit being an identification bit for identifying the input condition circuit.

23. The method according to claim 22 wherein the step of developing an identification bit and a synchronization bit includes generating an alternating sequence of "0" and "1" sync bits from a plurality of consecutive synchronization bits and alternating sending this sequence of sync bits with a predetermined sequence of identification bits, said predetermined identification bits including at least a predetermined sequence of zero bits and a one bit.

24. The method according to claim 20 further comprising the step of administering the stream of data bits from the parallel-to-serial logic circuit to a scrambler circuit in order to randomize the serial data stream prior to the serial data stream being administered to the laser transmitter circuit.

25. A method of converting a serial optical data stream to a parallel electrical data stream comprising the steps of:

administering the serial optical data stream to a laser receiver circuit for converting the serial optical data stream to a serial electrical data stream, said serial electrical data stream including data words where the length of the data words is set by the ratio of the link clock rate to a clock rate of a parallel-to-serial digital circuit sending the serial optical data stream;

administering the serial electrical data stream to a clock recovery circuit for removing a link clock rate from the serial electrical data stream;

administering the serial electrical data stream and the link clock rate to an output conditioner circuit for converting the serial electrical data stream to a parallel electrical data stream, the step of converting the serial data stream to the parallel data stream includes applying the serial data stream to a serial-to-parallel logic circuit and applying the link clock rate to a frequency divider circuit, wherein the step of applying the serial data signal tot eh serial-to-parallel logic circuit includes removing a frame bit from every predetermined number of serial data bits and wherein the step of applying the link clock rate to the frequency divider circuit includes applying the link clock rate to a plurality of frequency divider circuits to generate an internal sample clock rate, wherein the step of removing a frame bit includes applying the frame bit from the serial-to-parallel logic circuit to a frame detection circuit for removing an information frame bit from each predetermined series of data bits, the information frame bits including an alternating pattern of identification bits, synchronization bits and parity bits, wherein the frame detection circuit determines the sequence of synchronization bits to establish synchronization acquisition.

26. The method according to claim 25 wherein the step of applying the serial data stream to the serial-to-parallel logic circuit includes the step of applying a load enable signal from a sample clock edge detection circuit such that the serial-to-parallel conversion rate is reduced to the sample clock rate.

27. The method according to claim 25 wherein the step of determining sync acquisition includes the step of generating a clock swallow command and applying the clock swallow command to the frequency divider circuits in the event that synchronization acquisition is not determined after a predetermined number of sample clock pulses, said clock swallow command instructing the frequency divider circuits to freeze for one link clock period.

28. The method according to claim 25 wherein the step of detecting a frame bit includes detecting a parity bit and applying the parity bit to a parity generation circuit along with the parallel data stream from the serial-to-parallel logic circuit in order to compute the parity of consecutive data words and compare it with the parity bit from the frame detection circuit, said parity logic circuit computing a parity error count.

29. The method according to claim 25 wherein the step of determining the channel ID bit includes applying the channel ID bit to a channel ID detection circuit for determining channel identification.

30. The method according to claim 25 further comprising the step of applying the parallel data stream from the serial-to-parallel logic circuit to a deskew circuit for clocking the data out of the output conditioner circuit with either the internal sample clock rate or an external sample clock applied to the output conditioner circuit.

31. The method according to claim 25 further comprising the step of applying the serial data from the clock recovery circuit to a descrambler circuit for descrambling the data into a form prior to being applied to a random bit generator at a transmitting stage.

32. A digital circuit for converting an electrical parallel digital data signal to an electrical serial digital data signal for transmission of the data, said circuit comprising:
a microcontroller for controlling the operation of the digital circuit; and
an input conditioner circuit including a parallel-to-serial logic circuit for converting electrical parallel data into electrical serial data, said parallel-to-serial logic circuit including a parallel-to-serial shift register for accepting parallel data at a sample clock rate and emitting serial data at a link clock rate, said input conditioner circuit further including a frequency divider circuit, said frequency divider circuit including three divide down counters selectively programmable by the microcontroller for dividing down the link clock rate to the sample clock rate in a desirable fashion such that the number of serial data bits per data word being shifted out of the parallel-to-serial shift register is selectively set to a particular data word length by the ratio of the link clock rate to the sample clock rate, said input conditioner circuit further including an identification and synchronization logic circuit accepting a predetermined identification digital signal from the microcontroller, said identification and synchronization logic circuit generating an alternating "0" and "1" synchronization bit pattern and selectively alternating between the alternating sync bit pattern and the predetermined identification bit, said identification and synchronization logic circuit outputting the identification and sync bit pattern to the parallel-to-serial logic circuit, said identification and synchronization logic bit circuit including a 2-bit counter, said 2-bit counter selecting the alternating sequence between the sync bit pattern and the identification bit or admitting a parity valid signal to the parallel-to-serial logic circuit, said identification and synchronization logic circuit further including means for selecting as the identification digital signal an 11-bit identification signal from the microcontroller preceded by a string of twelve "0" bits and a "1" bit.

33. A digital circuit for converting an electrical parallel digital data signal to an electrical serial digital data signal for transmission of the data, said circuit comprising:
a microcontroller for controlling the operation of the digital circuit; and
an input conditioner circuit including a parallel-to-serial logic circuit for converting electrical parallel data into electrical serial data, said parallel-to-serial logic circuit including a 20-bit parallel-to-serial shift register for accepting parallel data at a sample clock rate and emitting serial data at a link clock rate, said input conditioner circuit further including a frequency divider circuit, said frequency divider circuit including three divide down counters selectively programmable by the microcontroller for dividing down the link clock rate to the sample clock rate in a desirable fashion such that the number of serial data bits per data word being shifted out of the parallel-to-serial shift register is selectively set to a particular data word length by the ratio of the link clock rate to the sample clock rate, said parallel-to-serial logic circuit further including a stuff bit generator circuit, said stuff bit generator circuit being a circular register generating a predetermined stuff bit combination and emitting the stuff bit combination to the parallel-to-serial shift register as a serial data input such that if the serial data output of the parallel-to-serial shift register exceeds the load rate of the parallel data into the parallel-to-serial shift register, the stuff bit combination will be serially output at the end of the parallel data input, wherein if the ratio of the link clock to the sample clock is greater than 20 the stuff bit combination from the stuff bit generator will be output to the 20-bit shift register and if the link clock rate to sample clock rate ratio is less than 20, only that number of bits will be serially output from the 20-bit parallel-to-serial shift register.

34. A digital circuit for converting an electrical parallel digital data signal to an electrical serial digital data signal for transmission of the data, said circuit comprising:
a microcontroller for controlling the operation of the digital circuit; and
an input conditioner circuit including a parallel-to-serial logic circuit for converting electrical parallel data into electrical serial data, said parallel-to-serial logic circuit including a parallel-to-serial shift register for accepting parallel data at a sample clock rate and emitting serial data at a link clock rate, said input conditioner circuit further including a frequency divider circuit, said frequency divider circuit including three divide down counters selectively programmable by the microcontroller for dividing down the link clock rate to the sample clock rate in a desirable fashion such that the number of serial data bits per data word being shifted out of the parallel-to-serial shift register is selectively set to a particular data word length by the ratio of the link clock rate to the sample clock rate, said parallel-to-serial logic circuit further including a stuff bit generator circuit, said stuff bit generator circuit being a circular register generating a predetermined stuff bit combination and emitting the stuff bit combination to the parallel-to-serial shift register as a serial data input such that if the serial data output of the parallel-to-serial shift register exceeds the load rate of the parallel data into the parallel-to-serial shift register, the stuff bit combination will be serially output at the end of the parallel data input, said parallel-to-serial logic circuit further including a parity generator logic circuit which receives the serial data from the parallel-to-serial shift register and calculates the parity of two consecutive data words output from the parallel-to-serial shift register at the sample clock rate, said parity generating logic circuit outputting a parity generated bit to a parity bit selecting circuit, said parity selecting circuit also receiving an identification and synchronization bit as an input and outputting an alternating sequence of synchronization bit, parity bit, identification bit, parity bit as the most significant bit to a 19-bit parallel data word being input into the parallel-to-serial logic circuit.

35. A digital circuit for converting serial data bits into parallel data bits, said circuit comprising:
- a clock recovery circuit for separating a link clock rate from the serial data bits, said serial data bits including data words where the length of the data words is set by the ratio of the link clock rate to a clock rate of a parallel-to-serial digital circuit sending the serial data bits;
- an output conditioner circuit including a serial-to-parallel logic circuit and a frequency divider circuit, said frequency divider circuit receiving the link clock rate from the clock recovery circuit and dividing it down into a desirable sample clock rate, said serial-to-parallel logic circuit including a plurality of shift registers, a first shift register receiving serial data at the link clock rate and a second register shifting out parallel data at the sample clock rate, said output conditioner circuit further comprises a frame detection circuit, said frame detection circuit including a plurality of slave state machines and acquisition state machines, a first of the slave state machines receiving a frame bit input from the parallel-to-serial logic circuit and outputting the frame bit to subsequent slave state machines at the sample clock frequency, each of the slave state machines having an output, wherein the outputs of each slave state machine are applied as inputs to the acquisition sate machines at a range of the sample clock divided by four such that each of the acquisition state machines determines if the output of each slave state machines is an alternating sequence of "0" and "1" frame sync bits, wherein at the end of a predetermined number of clock cycles if none of the acquisition state machines has counted a predetermined number of alternating "0" and "1" sync bits then the acquisition state machines generate a clock swallow output to the frequency divider circuit in order to freeze the divider circuit one link clock period; and
- a microcontroller for controlling the operation of the digital circuit.

36. A digital circuit for converting serial data bits into parallel data bits, said circuit comprising:
- a clock recovery circuit for separating a link clock rate from the serial data bits, said serial data bits including data words where the length of the data words is set by the ratio of the link clock rate to a clock rate of a parallel-to-serial digital circuit sending the serial data bits;
- an output conditioner circuit including a serial-to-parallel logic circuit and a frequency divider circuit, said frequency divider circuit receiving the link clock rate from the clock recovery circuit and dividing it down into a desirable sample clock rate, said serial-to-parallel logic circuit including a plurality of shift registers, a first shift register receiving serial data at the link clock rate and a second register shifting out parallel data at the sample clock rate, said output conditioner circuit including a parity logic circuit for computing the parity of the digital data signal, said parity logic circuit including first circuit means for determining the parity of consecutive words of data and parity comparison means for comparing the computed parity with a parity bit from the serial-to-parallel logic circuit, said parity logic circuit further including second circuit means for comparing the compared parity bit with a sync bit from said serial-to-parallel logic circuit and a counter for counting parity error counts; and
- a microcontroller for controlling the operation of the digital circuit.

37. A method of converting a parallel electrical data bit signal to a serial optical data bit signal having high flexibility in frequency sample rates and word sizes, said method comprising the steps of:
- introducing a parallel electrical data bit signal to an input conditioner circuit at an external data clock sample rate;
- generating an internal sample clock rate and a transmission link clock rate in phase with the external sample clock rate by means of a phased locked loop circuit, said step of generating an internal sample clock rate includes the steps of applying a voltage controlled oscillator clock from the phase locked loop circuit to a frequency divider circuit to divide the voltage controlled oscillator clock down to the internal sample clock rate, said step of applying the voltage controlled oscillator clock to a frequency divider circuit includes applying a frequency select input to the frequency divider circuit to selectively set the ratio between the link clock rate and internal sample clock rate;
- applying the parallel data bit signal to a parallel-to-serial logic circuit for converting the parallel digital data signal to a serial digital data signal, said parallel-to-serial data signal circuit including an output of serial data divided up into individual frames of data, each individual frame of data having an information frame bit and a desired data word length selectively set by the ratio of the link clock rate to the internal sample clock rate, wherein the step of separating the parallel data signal into frames of serial data includes developing a four frame sequence of serial data bits wherein the frame bit of each frame includes a particular information bit, one of those frame bits being a synchronization bit, a second and fourth frame bit being a parity bit set from the determination of parity of two consecutive frames of data and a third frame bit being an identification bit for identifying the input conditioner circuit; and
- applying the serial data from the parallel-to-serial logic circuit to a laser transmitter circuit for converting the electrical serial data signal to the optical serial data signal.

* * * * *